(12) United States Patent
Leslie

(10) Patent No.: US 12,401,663 B2
(45) Date of Patent: Aug. 26, 2025

(54) STACK-HAC FOR MACHINE LEARNING BASED BOTNET DETECTION

(71) Applicant: Raytheon Company, Arlington, VA (US)

(72) Inventor: Nandi O. Leslie, Silver Spring, MD (US)

(73) Assignee: Raytheon Company, Arlington, VA (US)

(*) Notice: Subject to any disclaimer, the term of this patent is extended or adjusted under 35 U.S.C. 154(b) by 298 days.

(21) Appl. No.: 17/844,438

(22) Filed: Jun. 20, 2022

(65) Prior Publication Data

US 2023/0412618 A1    Dec. 21, 2023

(51) Int. Cl.
*H04L 9/40* (2022.01)
(52) U.S. Cl.
CPC ............... *H04L 63/1416* (2013.01)
(58) Field of Classification Search
CPC .................................................. H04L 63/1416
USPC ............................................................ 726/23
See application file for complete search history.

(56) References Cited

U.S. PATENT DOCUMENTS

2020/0233862 A1* 7/2020 Shaked .................. G06F 18/24

FOREIGN PATENT DOCUMENTS

CN       108881277 A   * 11/2018    ......... H04L 63/1416

OTHER PUBLICATIONS

Masoud, Hierarchical Agglomerative Clustering Using Common Neighbours Similarity, IEEE, 2016, pp. 546-551 (Year: 2016).*
Vijaya et al , An Efficient Hybrid Hierarchical Agglomerative Clustering (HHAC) Technique for Partitioning Large Data Sets, Lecture notes in computer science vol. 3776, pp. 583-588 (Year: 2005).*
Bahnsen, Alejandro Correa, et al., "Fraud detection by stacking cost-sensitive decision trees", Data Science for Cyber-Security, (Jul. 27, 2017), 15 pgs.
Garcia, S., et al., "The CTU-13 dataset. a labeled dataset with botnet, normal and background traffic", Retrieved Online. URL: <https://www.stratosphereips.org/datasets-ctu13/>, (2014), 5 pgs.
Leslie, Nandi, "An Unsupervised Learning Approach for In-Vehicle Network Intrusion Detection", 2021 55th Annual Conference on Information Sciences and Systems (CISS), Baltimore, MD, USA, (2021), 1-4.

(Continued)

*Primary Examiner* — Moeen Khan
(74) *Attorney, Agent, or Firm* — Schwegman Lundberg & Woessner, P.A.

(57) ABSTRACT

Discussed herein are devices, systems, and methods for detecting anomalous or malicious processes based on a network session. A method includes receiving a network session, implementing a stacked hierarchical agglomerative clustering (HAC) algorithm that operates multiple HAC algorithms to identify respective clusters to which the network session maps, each HAC algorithm of the StackHAC algorithm operates using a different linkage function and distance pair, appending the respective clusters from the multiple HAC algorithms to a feature vector representing the network session resulting in an augmented feature space, and determining, using a classifier or clustering model that operates using the augmented feature space as input, whether each of the network sessions is associated with a network intrusion.

15 Claims, 5 Drawing Sheets

(56) References Cited

OTHER PUBLICATIONS

Leslie, Nandi O., "Using Semi-Supervised Learning for Flow-Based Network Intrusion Detection", Proceedings of the 23rd International Command and Control Research and Technology Symposium (ICCRTS): Multi-Domain C2. Pensacola, FL, (2018), 7 pgs.

Yavanoglu, Ozlem, et al., "A review on cyber security datasets for machine learning algorithms", 2017 IEEE International Conference on Big Data (Bigdata), (Dec. 2017), 2186-2193.

* cited by examiner

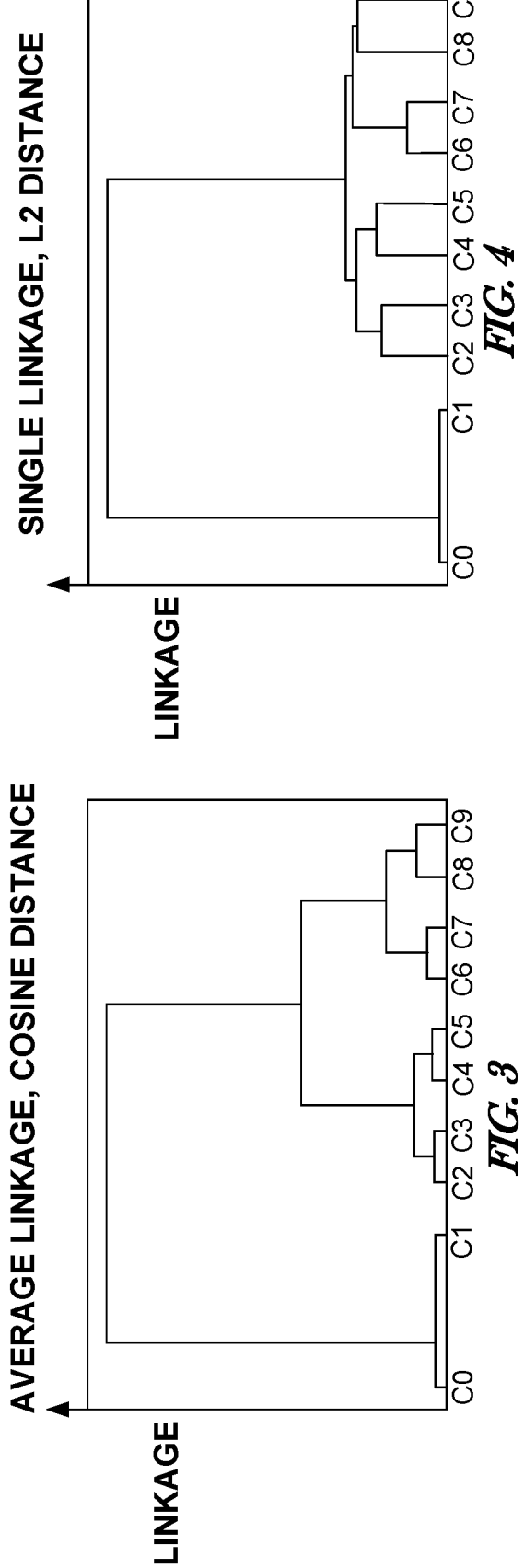
FIG. 4
FIG. 3
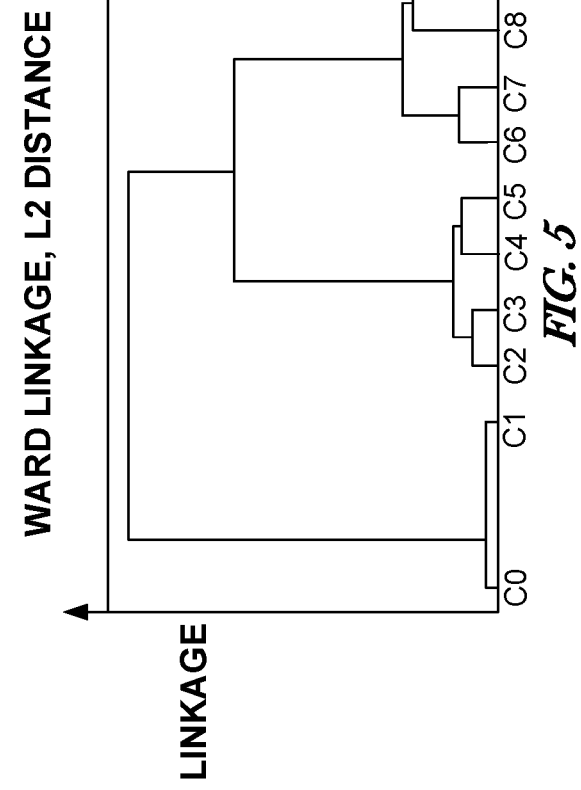
FIG. 5

STACK-HAC FOR MACHINE LEARNING BASED BOTNET DETECTION

TECHNICAL FIELD

Embodiments discussed herein regard devices, systems, and methods for detecting botnets or other cyberattacks.

BACKGROUND

For nearly forty (40) years, computer scientists, mathematicians, and engineers have been concerned with the problem of monitoring networks for unauthorized activities with computational modeling approaches. More recently, there has been substantive research on which methods and algorithms for anomaly-based intrusion detection systems (IDS) adequately protect enterprise and mobile networks from such attacks. Nonetheless, networks remain vulnerable to a variety of remote attacks that erode information confidentiality, availability, and integrity. These attacks are considered cyberattacks.

BRIEF DESCRIPTION OF THE DRAWINGS

FIGS. 3, 4, and 5 illustrate respective dendrograms of different HAC algorithms resulting from same network sessions.

DETAILED DESCRIPTION

Figure 1:
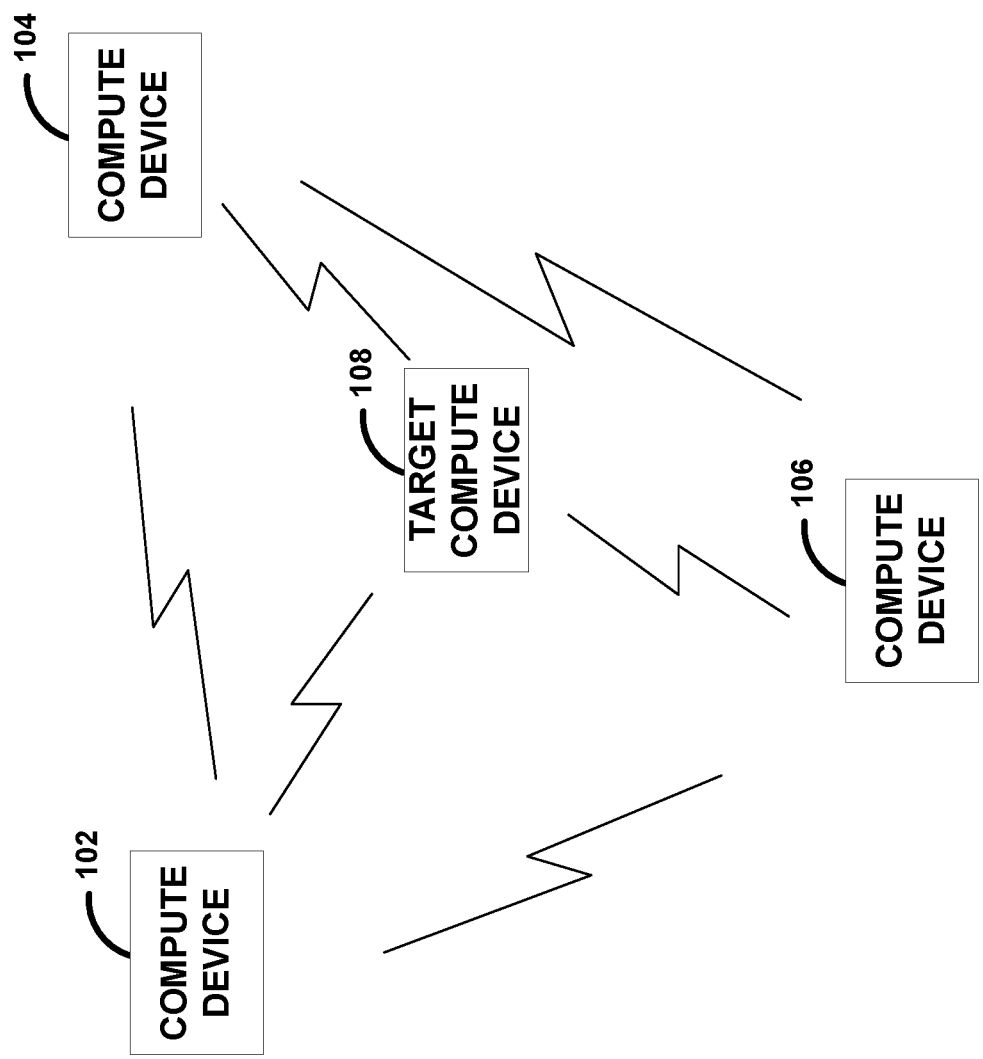
FIG. 1 illustrates, by way of example, a block diagram of an embodiment of a network intrusion.

Embodiments provide systems, methods, devices, and computer-readable media that use an ensemble learning approach based on stacking hierarchical agglomerative clustering (StackHAC) algorithms for monitoring a network and detecting cyberattacks. The hierarchical agglomerative clustering (HAC) algorithms are unsupervised learning approaches with different linkages and pairwise distances on a network session. This is a meta-algorithm in which clusters (or encodings of the clusters) output from each of the HAC algorithms are appended to the feature space resulting in an enhanced feature space. The enhanced feature space can be input into a classifier or an additional clustering algorithm that determines whether an observation (or network flow data) corresponds to a benign, malicious, or even a specific type of malicious activity. The approach of embodiments is attractive for at least two reasons: (1) unsupervised learning is suitable for detecting cyberattacks in the often unlabeled network traffic domain, which may also exhibit anomalous patterns (e.g., zero-day attacks); and (2) stacked models help yield improved performance on the collection of approaches than could be achieved with one single model. The prediction performance, for some network sessions, yields a precision of about 0.9989, recall of 1.0, and a false positive rate of about 0.000652.

A network session is metadata about network traffic traversing a network device, such as a router, switch, or host. Network session or flow metadata is data about the packet headers that comprise the network traffic. Network sessions metadata (e.g., NetFlow data) carries traits pertaining to the structure and contents of network protocols and packets. Metadata includes telemetry of network connections and the artifacts associated with these connections. Data flow is contrasted with network packet capture. Network packet capture contains full detail of the network traffic. Network packet capture is more onerous than network session data in terms of data processing and storage.

The network session can be metadata at any of the open systems interconnections (OSI) model layers. Typically, the metadata regards traffic on one or more of layers 3-7 of the OSI model (e.g., the application layer, presentation layer, session layer, transport layer, and network layer).

A flow is a unidirectional sequence of packets that share common values in corresponding entries. In the example of Cisco NetFlow packets of a flow share an ingress interface, source internet protocol (IP) address, destination IP address, IP protocol, source port, destination port, and IP type of service. IPv6, multi-protocol label switching (MPLS), and Ethernet flows can be defined in a similar manner.

Common metadata included in a packet includes an input interface index (e.g., used by simple networking management protocol (SNMP)), an output interface index (zero if the packet is dropped), timestamps for flow start and finish times (e.g., typically in milliseconds), number of bytes and packets observed in the flow, layer 3 headers, such as source and destination IP address, internet control message protocol (ICMP) type and code, IP protocol, type of service value, or a combination thereof, source and destination port numbers for TCP, unigram data protocol (UDP), SCTP, or the like, union of all TCP flags observed over the life of the flow, layer 3 routing information, such as IP address of the immediate next-hop along the route to the destination, source and destination IP masks, or a combination thereof, among others.

Embodiments can pre-process a network session by converting categorical features to numerical features, such as with a one-hot encoding algorithm. Embodiments can then perform feature normalization such that the features have zero mean and unit standard deviation. Subsequently, embodiments can reduce feature space dimensionality with Principal Component Analysis (PCA), while maintaining over 99% accuracy over the variability with the remaining principal components.

Embodiments develop the StackHAC algorithm using multiple linkage functions to measure distance between clusters and various distance metrics used to compute the linkage. A HAC algorithm is an unsupervised learning algorithm that assumes a bottom-up approach to clustering a set of observations N. Each observation is initially in a single cluster, and the N clusters are recursively merged such that at the next step, there are N−1 mutually exclusive clusters, where 2 clusters are merged of the possible N(N−1)/2 pairs that maximize the objective function, given the linkage criteria selected for grouping. This clustering is repeated until some predefined fixed number (an integer greater than or equal to one) of clusters remain.

Embodiments consider 4 different dissimilarities to find the distance between any two clusters, G and H: single, complete, group average, and Ward. The intergroup dissimilarity, or diameter for the single linkage HAC, is a nearest neighbor technique for determining, which is the closest pair of clusters, $$d(G, H) = \min_{\substack{i \in G \\ j \in H}} d_{ij} \quad (1)$$

where $d_{ij}$ is the metric to determine the pairwise distance between observations for $i \in G$ and $j \in H$. Embodiments consider a plurality of metrics, $d_{ij}$: Euclidean (also commonly referred to as $L^2$), $L^1$, and cosine distances. The complete linkage in Equation (2) takes the largest dissimilarity (or furthest distance) between two clusters $$d(G, H) = \max_{\substack{i \in G \\ j \in H}} d_{ij}, \quad (2)$$

and the group average linkage dissimilarity is defined in Equation (3) by $$d(G, H) = \frac{1}{N_G N_H} \sum_{i \in G} \sum_{j \in H} d_{ij}, \quad (3)$$

where $N_G$ and $N_H$ are the number of observations in clusters, G and H. Given a feature space $X=\{x_1, \ldots, x_N\}$ of observations $x_k \in \mathbb{R}^p$ for $k=1, \ldots, N$ and $p \geq 1$, the dissimilarity for the Ward linkage is given by Equation (4)

$$d(G,H) = \Sigma_{x_k \in G \cup H} \|x_k - \mu_{G=H}\|^2, \quad (4)$$

where $\mu$ is the centroid of the new cluster merged from G and H.

Subsequently, embodiments can append the cluster assignments from the different HAC algorithms to the reduced dimensionality of the feature space. The cluster assignments from each HAC algorithm for each observation are stacked onto the reduced feature space to serve as input into a final machine learning algorithm (e.g., logistic regression) for intrusion detection.

The following aspects of the anomaly-based IDS algorithm for various types of network traffic, including IP and vehicle controller access network (CAN) bus cyberattacks are example advantages of embodiments:

i. A HAC algorithm from unsupervised learning for network intrusion detection. Embodiments provide predictions from a stacking approach of multiple HAC algorithms, where appropriate combinations of multiple linkages—Ward, single, average, and complete—and affinities—Euclidean, $L^1$, and cosine—are implemented and examined and the results inform another classifier.

ii. Embodiments provide an application of the StackHAC algorithm to anomaly-based intrusion detection for network sessions.

iii. Embodiments provide an evaluation of prediction results, precision, recall, and false positive rate (FPR), for network attack detection.

Embodiments will now be described with reference to the FIGS.

FIG. 1 illustrates, by way of example, a block diagram of an embodiment of a network intrusion. The network intrusion includes a compute device 102, 104, 106 communicatively coupled to each other and a target compute device 108. An intruder can have a goal of co-opting, retrieving data from, of having a user of the target device 108 performing an operation. The operation can include opening a file, executing a program, visiting a website, connecting to another device, such as the compute device 102, 104, 106, or the like. The operation can benefit the intruder or can be a part of a scheme to help the user. The operation is a network intrusion, and it is a goal of embodiments to detect this network intrusion.

Types of network intrusions include a botnet, distributed denial of service (DDoS), internet relay chat (IRC), web attack, port scan, brute force, infiltration. A botnet is a network of compute devices infected with malicious software and controlled as a group without permission from the owners of the compute devices. A DoS occurs when legitimate users are unable to access network resources (e.g., information, devices, systems) due to the actions of the intruder. IRC is a text-based system for instant messaging (IM). IRC is designed for group communication in discussion forums. IRC can be exploited using packet sniffing, such as to retrieve credentials of the user in a takeover war. A web attack targets vulnerabilities in a website to gain unauthorized access, obtain confidential information, introduce malicious content, or alter content of the website. A port scan is a method for determining which ports of a network are open for communication. Brute force is a hacking method that uses trial and error to find a valid password or other login credentials, encryption keys, or the like. Infiltration is an unauthorized entry of program code into a computer to perform an operation. The operation is often concealed and not desired by the owner of the device that is performing the operation.

The network of FIG. 1 does not support any security features intrinsically. In most implementations, applications are expected to deploy their own security mechanisms. Failure to implement adequate security measures may result in various sorts of attacks by the intruder.

To help provide security for such vulnerabilities, embodiments include a monitor 200 (see FIG. 2) that receives network session s 220 (see FIG. 2) and determines whether the packets 220 are related to anomalous or benign behavior. The monitor 200 can be implemented using software, hardware, firmware, or combination thereof. The monitor 200 can include electric or electronic components organized, electrically coupled, or otherwise configured to perform operations of the monitor 200. The electric or electronic components can include one or more transistors, resistors, capacitors, diodes, inductors, switches, oscillators, logic gates (AND, OR, XOR, negate, buffer, or the like), multiplexers, amplifiers, power supplies, memory devices, processor devices [e.g., central processing units (CPUs), graphics processing units (GPUs), field programmable gate arrays, application specific integrated circuits], power supplies, analog to digital converters, digital to analog converters, regulators, converters, inverters, or the like. The monitor 200 can perform the operations of method 600 of FIG. 6.

Figure 2:
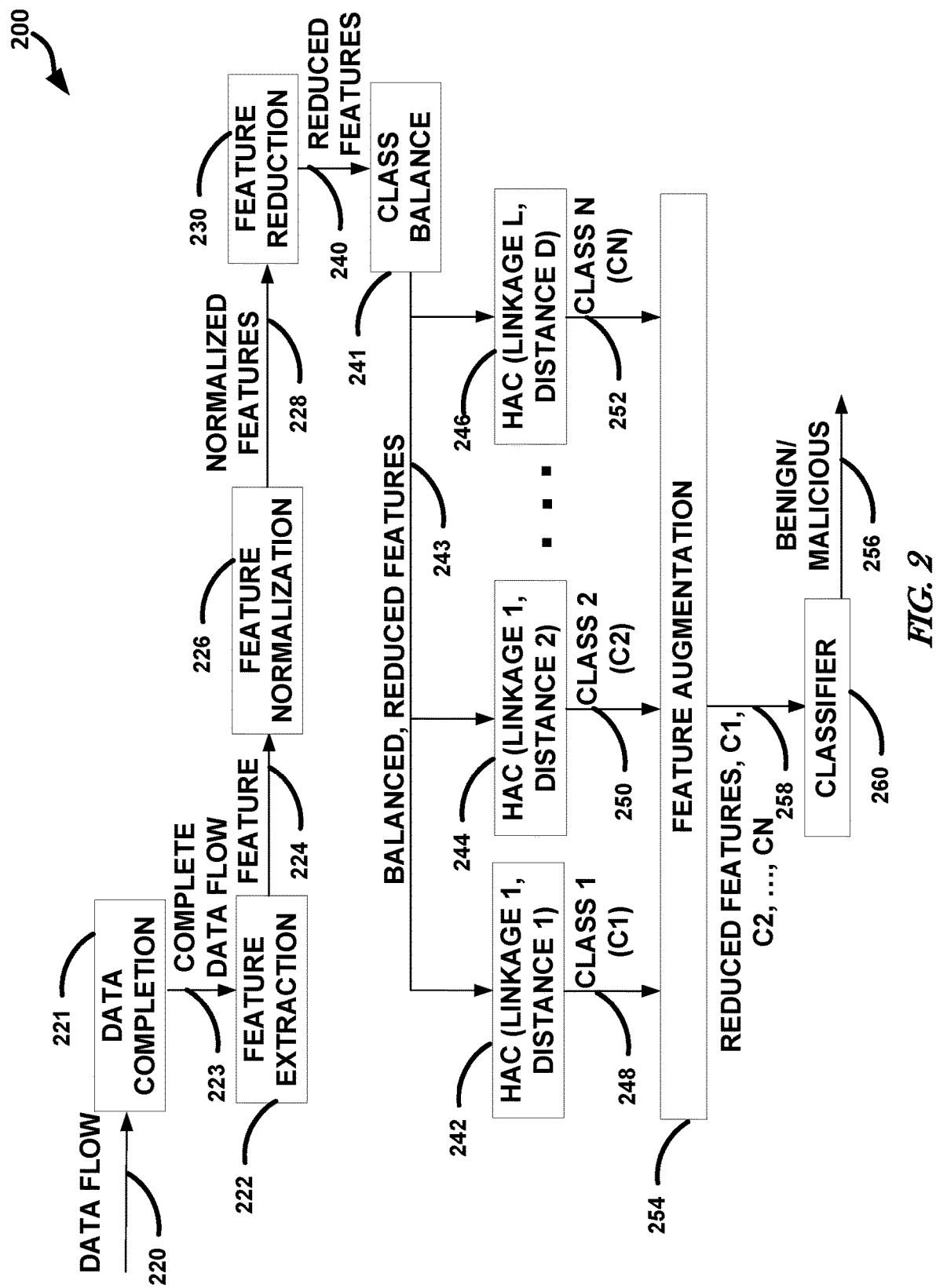
FIG. 2 illustrates, by way of example, a flow diagram of an embodiment of a monitor for network intrusion detection.

FIG. 2 illustrates, by way of example, a flow diagram of an embodiment of a monitor 200 for network intrusion detection. The monitor 200 as illustrated receives a network session 220. The network session 220 can include an input interface index (e.g., used by SNMP), an output interface index (zero if the packet is dropped), timestamps for flow start and finish times (e.g., typically in milliseconds), number of bytes and packets observed in the flow, layer 3 headers, such as source and destination IP address, ICMP type and code, IP protocol, type of service value, or a combination thereof, source and destination port numbers for TCP, UDP, SCTP, or the like, union of all TCP flags observed over the life of the flow, layer 3 routing information, such as IP address of the immediate next-hop along the route to the destination, source and destination IP masks, or a combination thereof, among others.

Sometimes the packet 220 is incomplete. Operation 221 can complete the data packet 220 to generate a complete network session 223. A HAC algorithm 242, 244, 246 operates on data with respective features. If a feature is not present or has an unintelligible value (unintelligible to the HAC algorithm 242, 244, 246), the HAC algorithm 242, 244, 246 can operate to produce inaccurate results. The operation 221 operates to allow the HAC algorithms 242, 244, 246 to operate accurately. The data completion operation 221 can include altering text to numerical values, such as by using a one-hot encoding, word2vec, GloVe, or the like. The data completion operation 221 can include replacing a missing entry or a not a number entry with a zero. The data completion operation 221 can include using a statistical technique to determine a missing value (e.g., a zero value or an empty field or the like). Example statistical techniques can include multiple imputation by chained equations (MICE), imputation using an average value (e.g., mean, median, mode), imputation using most frequent value or zero values, imputation using a machine learning (ML) model (e.g., k-means clustering, deep learning (DL)), stochastic regression, extrapolation, interpolation, and hot-deck imputation.

Feature extraction can be performed at operation 222. The operation 222 can include identifying information in the network session 220 that can be relevant to a determination of whether the data packet is malicious or benign. The extracted features can include individual entries of the network session 220. The operation 222 produces features 224. The features 224 are numeric values that represent the state of the condition being monitored by the monitor 200.

The features 224 can be normalized at operation 226. Feature normalization maps feature values in a first range to feature values in a different, second range. The second range can be [0, 1] or other range. The operation 226 results in a normalized feature 228. At operation 230, the features can be reduced. There are various techniques for feature dimensionality reduction in the feature space including PCA, independent component analysis, linear discriminant analysis, among others. Dimensionality reduction can reduce training time, can help avoid overfitting, can aid data visualization, compress the data, and can even transform non-linear data to linearly separable data.

The result of dimensionality reduction using the operation 230 is reduced features 240. Following feature space dimensionality reduction 240, class balance operation is performed 241. The class balance operation 241 can include oversampling minority examples based on results of a clustering technique. The class balance operation 241 can include a synthetic minority oversampling technique (SMOTE). For example, using the operation 241, the reduced feature space 240 can be grouped into classes and the classes with fewer network sessions mapped thereto can be oversampled (duplicated and added to the training set). A result of the operation 241 is balanced, reduced features 243.

The balanced, reduced features 243 can be input to a plurality of HAC algorithms 242, 244, 246. The number of HAC algorithms 242, 244, 246 is variable and can be an integer number greater than one (1). Each of the HAC algorithms 242, 244, 246 can be based on different linkage functions and pairwise distances. A linkage function determines the distance between clusters or sets of observations as a function of pairwise distances between observations. Example linkage functions include Ward, complete (sometimes called maximum), average (weighted or unweighted average), and single (sometimes called nearest neighbor). A metric or pairwise distance between observations can include $L^1$, Euclidean ($L^2$), squared Euclidean, cosine, maximum, Mahalanobis, among others. Ultimately, the linkage and pairwise distance can alter how each observation is clustered.

A HAC algorithm (sometimes called "HAC technique") is a "bottom-up" up approach to clustering in which each observation starts in its own cluster and pairs of clusters are merged based on the linkage functions and metrics. Assume there are N observations (network session s 220 in the context of this application). Each of the N observations is assigned its own cluster in feature space. The linkage (which uses the specified distance in its function) can be determined and used to cluster two of the N observations. The clusters that contain the closest pair of elements not yet belonging to the same cluster according to the linkage can be clustered into a single cluster. After the first clustering operations, there are N−1 clusters, after the second clustering operation, there are N−2 clusters, and so on. The HAC algorithm 242, 244, 246 can be iterated until there are a specified number of clusters. The clusters in this context represent as many normal operation (benign) clusters as desired and as many malicious clusters as desired. For example, if the number of clusters is two (2), the first cluster represents normal behavior and the second cluster represents malicious behavior. Thus, when the balanced, reduced features 243 of the next network session 220 are determined to be closer to the first cluster, the network session 220 is considered normal and when the balanced, reduced features 243 of the next network session 220 are determined to be closer to the second cluster, the network session 220 is considered malicious. If there are more than two clusters, the third cluster can represent an additional type of malicious or benign behavior.

The different HAC algorithms 242, 244, 246 can each produce a respective prediction 248, 250, 252 as to whether the data packet 220 is malicious or benign based on the cluster to which the network session 220 is mapped.

The operation 254 can include appending data indicating the classifications indicated by predictions 248, 250, 252 to the balanced, reduced features 243. The resulting vector is used as the feature vector 258 for a classifier 260. The operation 254 can include appending the predictions 248, 250, 252 to the reduced features 240. For example, assume the balanced, reduced feature vectors 243 are $\{F_1, F_2, \ldots, F_M\}$ and the predictions 248, 250, 252 are $\{C_1, C_2, \ldots, C_N\}$. The resulting features 258 produced by the operation 254 can be the feature vector $\{F_1, F_2, \ldots, F_M, C_1, C_2, \ldots, C_N\}$.

The classifier 260 can generate an output classification 256 indicating whether the network session 220 is benign or malicious based on the predictions 248, 250, 252 and the balanced, reduced features 243. The classifier 260 can operate use supervised learning, unsupervised learning, reinforcement learning, semi-supervised learning, self-supervised learning, active learning, ensemble learning, or the like to classify or cluster the observations based on the augmented features 258. More specifically, a clustering algorithm 260 can use K-means clustering, HAC, Gaussian mixture model, or the like, to determine the classification 256. The classifier 260 can use DL, logistic regression, support vector machine, or the like to determine the classification.

FIGS. 3, 4, and 5 illustrate respective dendrograms of different HAC algorithms 242, 244, 246 resulting from same network sessions 220. The y-axis represents the pairwise distance between observations (i.e., network session data) with the network sessions 220 (C0, C1, C2, C3, C4, C5, C6, C7, C8, C9) along the x-axis. Visually, the dendrograms for the 3 HAC algorithms are quite similar, and these models have accurate prediction performance metrics. The dendrogram of FIG. 3 is for average linkage and cosine distance. The dendrogram of FIG. 4 is for single linkage and $L^2$ distance. The dendrogram of FIG. 5 is for Ward linkage and $L^2$ distance. Other linkage functions and pairwise distance combinations can generate different dendrograms and clusters.

Figure 6:
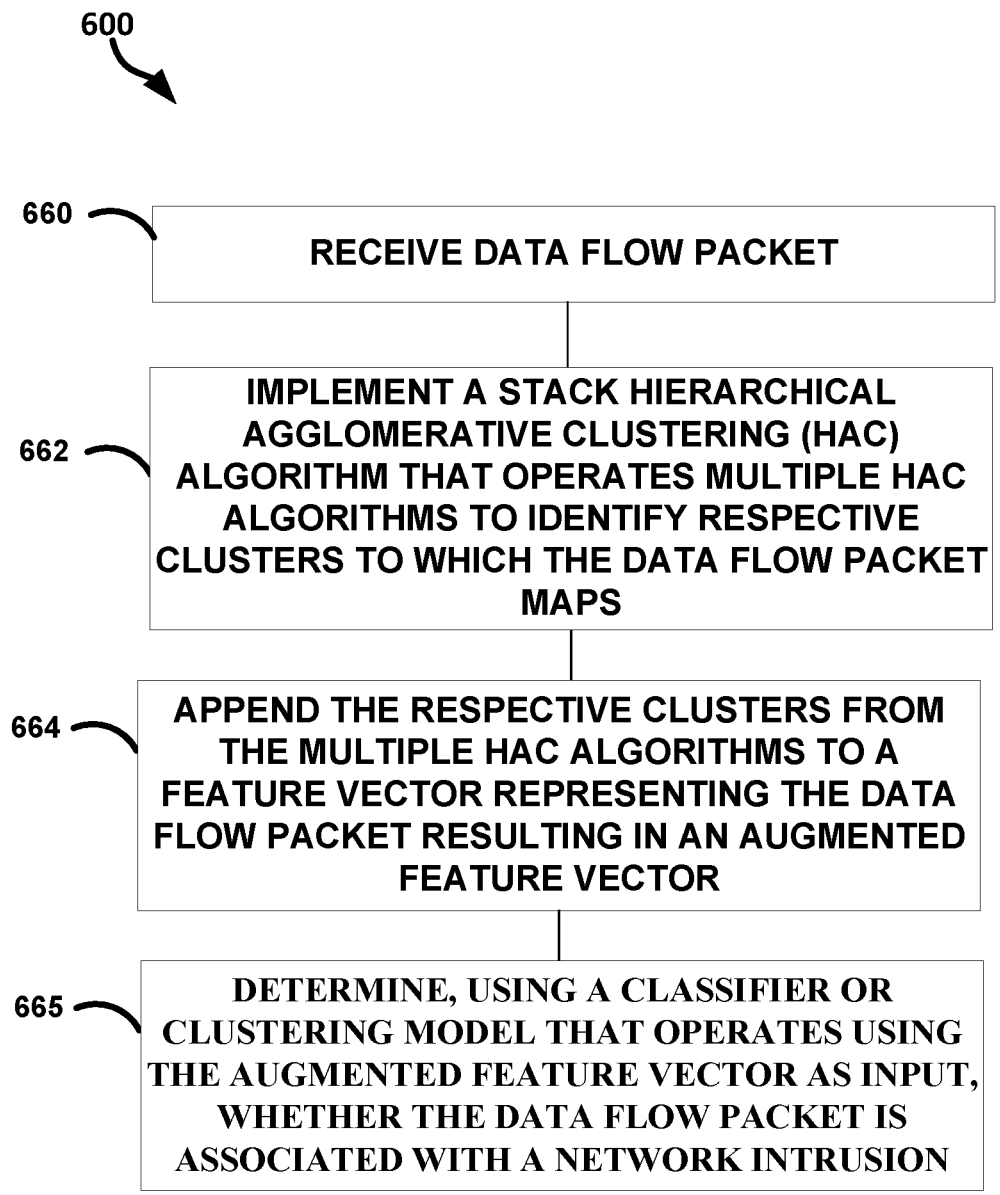
FIG. 6 illustrates, by way of example, a block diagram of an embodiment of a method for network intrusion detection.

FIG. 6 illustrates, by way of example, a block diagram of an embodiment of a method 600 for network intrusion detection. The method 600 as illustrated includes receiving a network session, at operation 660; implementing a stacked hierarchical agglomerative clustering (HAC) algorithm that operates multiple HAC algorithms to identify respective clusters to which the network session maps (each HAC algorithm of the StackHAC algorithm operates using a different linkage function and distance pair), at operation 662; appending the respective clusters from the multiple HAC algorithms to a feature vector representing the network session resulting in an augmented feature vector, at operation 664; and determining, using a classifier or clustering model that operates using the augmented feature vector as input, whether the network session is associated with a network intrusion, at operation 665.

The network intrusion can include a botnet, DDoS. The linkage functions can include two or more of Ward, average, simple, or complete linkage. The distances can include two or more of $L^1$, $L^2$, or cosine. Data of the network session includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

The method 600 can further include extracting features of the network session, and wherein the HAC algorithms of the StackHAC algorithm operate on the extracted features to cluster the network session. The method 600 can further include, wherein the operations further comprise, before extracting the features, completing the network session to alter text to numerical values and fill-in any empty fields of the network session.

Figure 7:
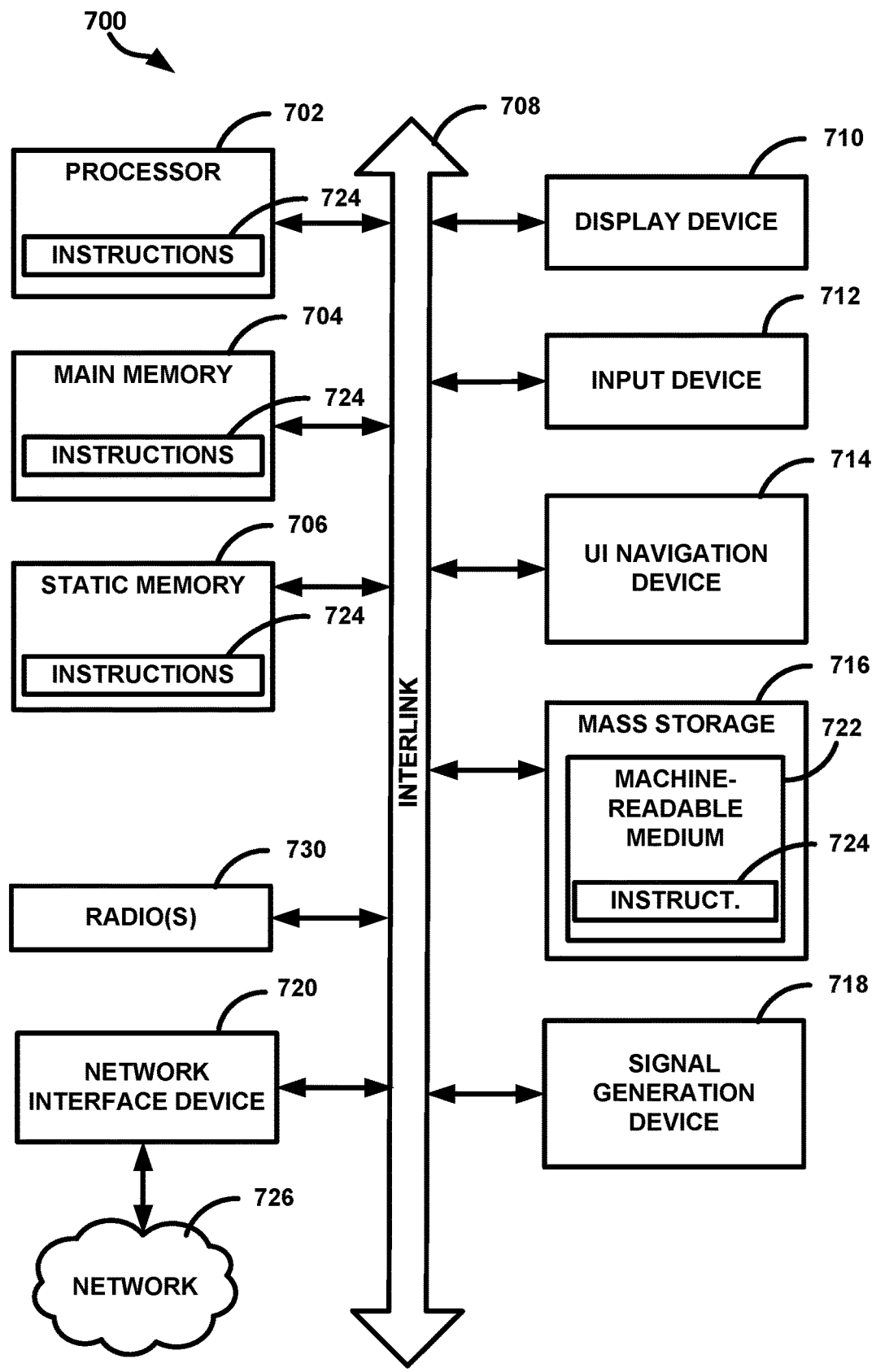
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., CPU, GPU), a main memory 704 and a static memory 706, which communicate with each other via a bus 708. The computer system 700 may further include a video display unit 710 (e.g., liquid crystal display, cathode ray tube). The computer system 700 also includes an alphanumeric input device 712 (e.g., keyboard), a user interface navigation device 714 (e.g., mouse), a mass storage unit 716, a signal generation device 718 (e.g., speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMAX networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a device of a network, the device comprising at least one memory including instructions stored thereon, and processing circuitry configured to execute the instructions, the instructions, when executed, cause the processing circuitry to perform operations comprising receiving a network session, implementing a stacked hierarchical agglomerative clustering (HAC) algorithm that operates multiple HAC algorithms to identify respective clusters to which the network session maps, each HAC algorithm of the StackHAC algorithm operates using a different linkage function and distance pair, appending the respective clusters from the multiple HAC algorithms to a feature vector representing the network session resulting in an augmented feature vector, and determining, using a classifier or clustering model that operates using the augmented feature vector as input, whether the network session is associated with a network intrusion.

In Example 2, Example 1 further includes, wherein the network intrusion includes a botnet.

In Example 3, at least one of Examples 1-2 further includes wherein the linkage functions include two or more of Ward, average, simple, or complete linkage.

In Example 4, at least one of Examples 1-3 further includes, wherein the distances include two or more of $L^1$, $L^2$, or cosine.

In Example 5, at least one of Examples 1-4 further includes, wherein data of the network session includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

In Example 6, Example 5 further includes, wherein the operations further comprise extracting features of the network session, and wherein the HAC algorithms of the StackHAC algorithm operate on the extracted features to cluster the network session.

In Example 7, Example 6 further includes, wherein the operations further comprise, before extracting the features, completing the network session to alter text to numerical values and fill-in any empty fields of the network session.

Example 8 includes a method including the operations of one of Examples 1-7.

Example 9 includes a non-transitory machine-readable medium including instructions that, when executed by a machine, cause the machine to perform operations of one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device of a computer network, the device comprising:
at least one memory including instructions stored thereon; and
processing circuitry configured to execute the instructions, the instructions, when executed, cause the processing circuitry to perform operations comprising:
receiving a network session;
completing the network session to alter text to numerical values and fill-in any empty fields of the network session;
extracting features of the network session;
implementing a stacked hierarchical agglomerative clustering (HAC) algorithm that operates multiple HAC algorithms to identify respective clusters to which the network session maps, each HAC algorithm of the StackHAC algorithm operates on the extracted features to cluster the network session using a different linkage function and distance pair, and each HAC algorithm outputting a cluster assignment;
appending each of the cluster assignments from each of the HAC algorithms to a feature vector representing the network session resulting in a combined augmented feature vector; and
determining, using a classifier or clustering model that operates using the combined augmented feature vector as input, whether the network session is associated with a network intrusion.

2. The device of claim 1, wherein the network intrusion includes a botnet.

3. The device of claim 1, wherein the linkage functions include two or more of Ward, average, simple, or complete linkage.

4. The device of claim 1, wherein the distances include two or more of $L^1$, $L^2$, or cosine.

5. The device of claim 1, wherein data of the network session includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

6. A non-transitory machine-readable medium including instructions that, when executed by a machine, cause the machine to perform operations for network intrusion detection, the operations comprising:
receiving a network session;
completing the network session to alter text to numerical values and fill-in any empty fields of the network session;
extracting features of the network session;
implementing a stacked hierarchical agglomerative clustering (HAC) algorithm that operates multiple HAC algorithms to identify respective clusters to which the network session maps, each HAC algorithm of the StackHAC algorithm operates on the extracted features to cluster the network session using a different linkage function and distance pair, and each HAC algorithm outputting a cluster assignment;
appending each of the cluster assignments from each of the HAC algorithms to a feature space representing the reduced and modified feature space of the network sessions resulting in a combined augmented or enhanced feature space; and determining, using a classifier or clustering model that operates using the combined augmented feature vector as input, whether the network session is associated with a network intrusion.

7. The non-transitory machine-readable medium of claim 6, wherein the network intrusion includes a botnet.

8. The non-transitory machine-readable medium of claim 6, wherein the linkage functions include two or more of Ward, average, simple, or complete linkage.

9. The non-transitory machine-readable medium of claim 6, wherein the distances include two or more of $L^1$, $L^2$, or cosine.

10. The non-transitory machine-readable medium of claim 6, wherein data of the network session includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

11. A method for network intrusion detection, the method comprising:

receiving a network session;

completing the network session to alter text to numerical values and fill-in any empty fields of the network session;

extracting features of the network session;

implementing a stacked hierarchical agglomerative clustering (HAC) algorithm that operates multiple HAC algorithms to identify respective clusters to which the network session maps, each HAC algorithm of the StackHAC algorithm operates on the extracted features to cluster the network session using a different linkage function and distance pair, and each HAC algorithm outputting a cluster assignment;

appending each of the cluster assignments from each of the HAC algorithms to a feature vector representing the network session resulting in a combined augmented feature vector;

and determining, using a classifier or clustering model that operates using the combined augmented feature vector as input, whether the network session is associated with a network intrusion.

12. The method of claim 11, wherein the network intrusion includes a botnet.

13. The method of claim 11, wherein the linkage functions include two or more of Ward, average, simple, or complete linkage.

14. The method of claim 11, wherein the distances include two or more of $L^1$, $L^2$, or cosine.

15. The method of claim 11, wherein data of the network session includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

* * * * *